(12) United States Patent
Liu

(10) Patent No.: US 6,296,078 B1
(45) Date of Patent: Oct. 2, 2001

(54) AXLE BEARING LUBRICATING DEVICE

(76) Inventor: JoBee Liu, 3F, No. 90-1, Chiuchieh Rd., Wuchieh Hsiang, Yilan County (TW)

( * ) Notice: Subject to any disclaimer, the term of this patent is extended or adjusted under 35 U.S.C. 154(b) by 0 days.

(21) Appl. No.: 09/490,006

(22) Filed: Jan. 21, 2000

(51) Int. Cl.[7] .................................................. F16N 11/10
(52) U.S. Cl. ..................... 184/29; 184/6.4; 184/39.1; 184/40; 184/57; 417/137
(58) Field of Search ........................... 184/29, 6.4, 39.1, 184/40, 54, 55.1, 57, 108; 417/118, 137, 143, 398–400; 384/322, 377, 462, 471, 473

(56) References Cited

U.S. PATENT DOCUMENTS

| | | | |
|---|---|---|---|
| 549,479 | * 11/1895 | Hall .................................. | 184/40 |
| 715,717 | * 12/1902 | Whitaker ........................... | 184/40 |
| 2,164,273 | * 6/1939 | Hodson ............................. | 184/29 |
| 3,693,757 | * 9/1972 | Callahan et al. ................. | 184/29 |
| 4,520,902 | * 6/1985 | Snow ................................. | 184/29 |
| 4,754,848 | * 7/1988 | Azzopardi et al. ............... | 184/29 |
| 5,060,761 | * 10/1991 | Arndt et al. ...................... | 184/29 |
| 5,285,871 | * 2/1994 | Sievenpiper ..................... | 184/29 |
| 5,450,924 | * 9/1995 | Tseng ............................... | 184/108 |
| 5,497,852 | * 3/1996 | Little et al. ....................... | 184/29 |
| 5,667,037 | * 9/1997 | Orlitzky .......................... | 184/108 |
| 6,145,626 | * 11/2000 | Niemczura, Sr. et al. ....... | 184/55.1 |

* cited by examiner

Primary Examiner—David A. Bucci
Assistant Examiner—Cheng H. Kim
(74) Attorney, Agent, or Firm—Pro-Techtor International Services

(57) ABSTRACT

An axle bearing lubricating device includes a grease storage tank for providing lubricating grease to at least one grease propeller, the grease storage tank having a grease outlet, at least one grease propeller for propelling grease from the grease storage tank to a respective axle bearing, the at least one grease propeller each having a piston reciprocated to expel lubricating grease to a respective axle bearing, a manifold connected between the grease outlet of the grease storage tank and air holes on each grease propeller, and a high pressure system controlled to output high pressure air to the at least one grease propeller to reciprocate the piston in each grease propeller for enabling lubricating grease to be applied to each axle bearing.

4 Claims, 7 Drawing Sheets

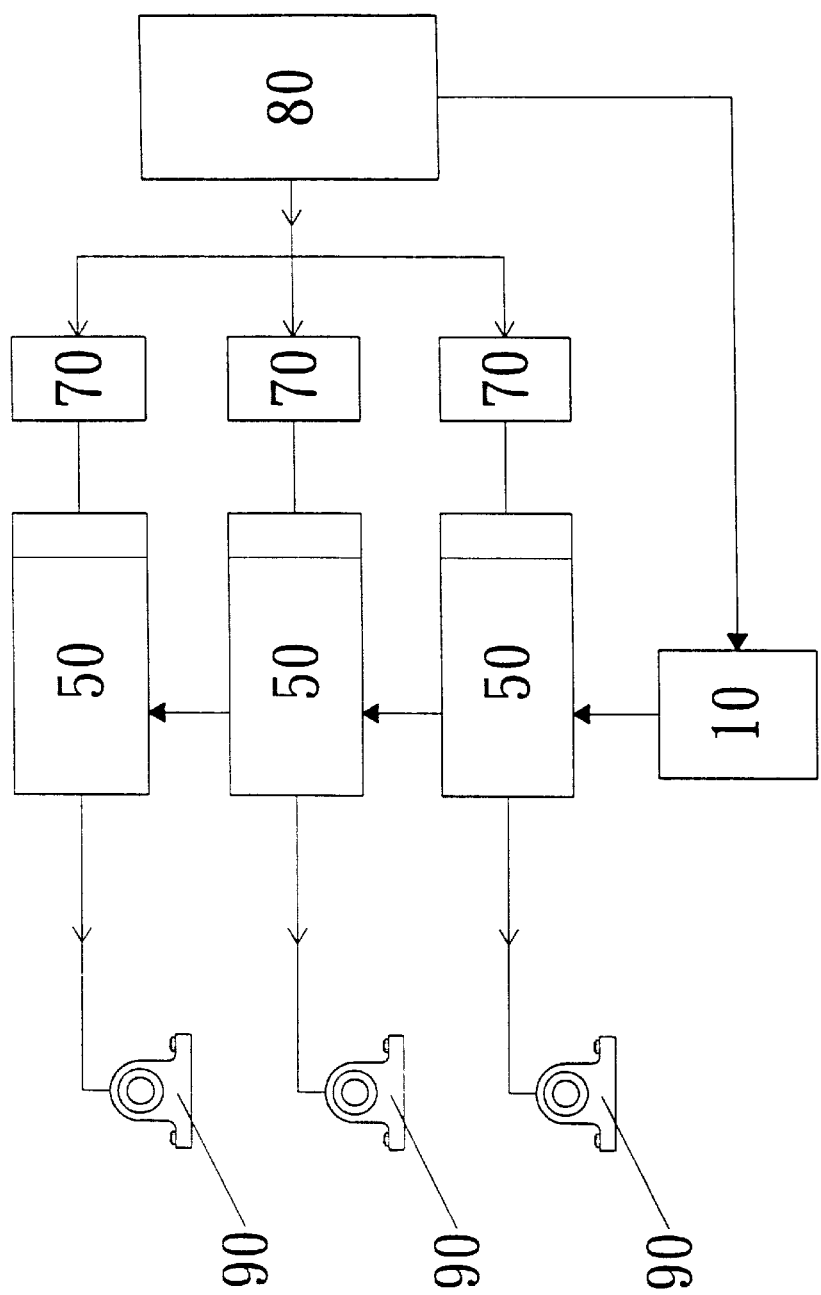
FIG:7

AXLE BEARING LUBRICATING DEVICE

BACKGROUND OF THE INVENTION

The present invention relates to an axle bearing lubricating device, which enables remote axle bearings in a factory to be automatically lubricated.

In a factory, automatic machines may be operated 24 hours a day. In order to keep automatic machines in high performance, the axle bearings of automatic machines must be regularly lubricated with lubricating grease. There is known an axle bearing lubricating device for this purpose. This structure of axle bearing lubricating device comprises a plurality of lubricating units. Each lubricating unit comprises a grease container, a motor, a transmission gear, and piston means. The piston means is driven by the motor through the transmission gear to propel lubricating grease out of the grease container into the grease-filling hole on the corresponding axle bearing. This structure of axle bearing lubricating device is still not satisfactory in function. Because the grease container contains only a limited amount of lubricating grease, it will be used up within a short time. When the grease container of one lubricating unit is used up, it must be replaced with a new one. Replacing the grease container of each lubricating unit is complicated. It is inconvenient and no economic to regularly replace the grease containers of the lubricating units. Further, the piston means tends to be stuck in the respective grease container, causing the respective motor to be burnt out.

SUMMARY OF THE INVENTION

The present invention provides an axle bearing lubricating device, which eliminates the aforesaid drawbacks. It is one object of the present invention to provide an axle bearing lubricating device, which is practical for lubricating multiple remote axle bearings. It is another object of the present invention to provide an axle bearing lubricating device, which enables the user to refill lubricating grease easily. It is still another object of the present invention to provide an axle bearing lubricating device, which is inexpensive to install. It is still another object of the present invention to provide an axle bearing lubricating device, which is easy to maintain. According to one aspect of the present invention, the axle bearing lubricating device comprises a grease storage tank for providing lubricating grease to at least one grease propeller, the grease storage tank having a grease outlet, at least one grease propeller for propelling grease from the grease storage tank to a respective axle bearing, the at least one grease propeller each having a piston reciprocated to expel lubricating grease to a respective axle bearing, a manifold connected between the grease outlet of the grease storage tank and air holes on each grease propeller, and a high pressure system controlled to output high pressure air to the at least one grease propeller to reciprocate the piston in each grease propeller for enabling lubricating grease to be applied to each axle bearing. According to another aspect of the present invention, each grease propeller comprises a cylinder, the cylinder comprising a front piston chamber, a longitudinal through hole axially extended from the center of the front piston chamber to a rear side thereof, a plurality of air holes disposed in communication between the piston chamber and the atmosphere, and a plurality of screw holes respectively disposed in communication between the longitudinal through hole and the atmosphere, a piston reciprocated in the front piston chamber, a piston rod fixedly and perpendicularly extended from the piston and moved with the piston in the longitudinal through hole in the cylinder, a first check valve installed in one end of the longitudinal through hole at the rear side of the cylinder remote from the piston chamber for enabling lubricating grease to be expelled out of the cylinder, a plurality of second check valves respectively installed in the screw holes for enabling lubricating grease to be delivered from the grease storage tank into the longitudinal through hole in the cylinder, a plurality of first connectors respectively installed in the air holes for enabling high pressure air to be delivered into the piston chamber to move the piston forwards, a cover covered on the front piston chamber, and a second connector installed in the cover for guiding air out of the piston chamber.

BRIEF DESCRIPTION OF THE DRAWINGS

FIG. 7 illustrates the arrangement of an alternate form of the axle bearing lubricating system according to the present invention.

DETAILED DESCRIPTION OF THE PREFERRED EMBODIMENT

Figure 5:
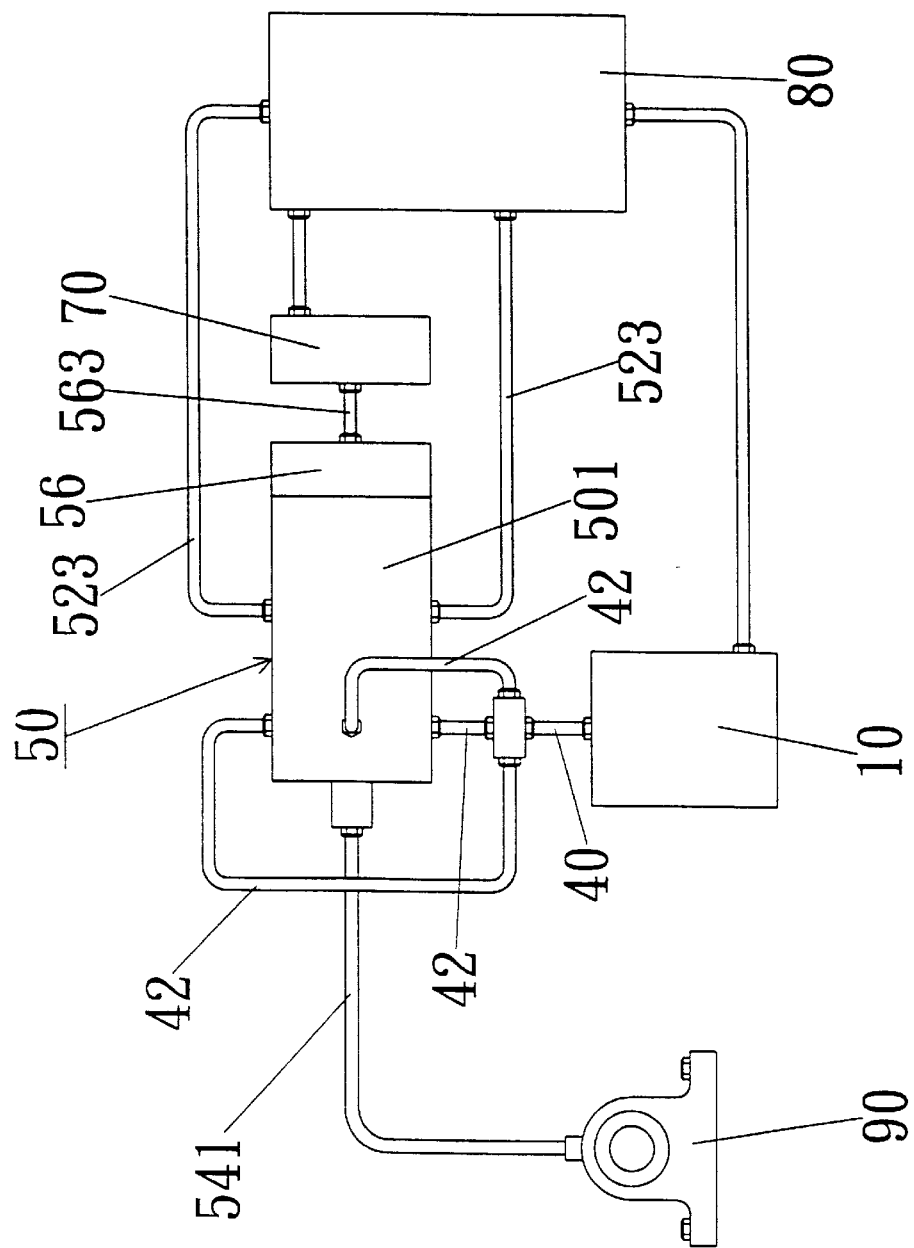
FIG. 5 illustrates the arrangement of the axle bearing lubricating system according to the present invention.

Referring to FIGS. from 1 through 6, an axle bearing lubricating device in accordance with the present invention is shown comprising a grease storage tank 10. The grease storage tank 10 has an output pipe 40 connected to a grease delivery manifold 42. The grease delivery manifold 42 has an output end connected to a grease propeller 50. The grease propeller 50 comprises a cylinder 501, a piston 51, first check valves 54, a plurality of second check valves 55, a plurality of first connectors 522, a second connector 562, a cover 56, and a piston rod 511. The cylinder 501 comprises a front piston chamber 52, a longitudinal through hole 53 axially extended from the center of the piston chamber 52 to the rear side thereof, a plurality of air holes 521 disposed in communication between the piston chamber 52 and the atmosphere, and a plurality of screw holes 531 respectively disposed in communication between the through hole 53 and the atmosphere. The first check valve 54 is installed in one end of the through hole 53 at the rear side of the cylinder 501 remote from the piston chamber 52. The second check valves 55 are respectively installed in the screw holes 531. The first connectors 522 are respectively installed in the air holes 521. The piston 51 is reciprocated in the front piston chamber 52. The piston rod 511 fixedly and perpendicularly extended from the piston 51, and moved with the piston 51 in the through hole 52. The cover 56 is covered on the front piston chamber 52 of the cylinder 501, comprising a center through hole 561 disposed in communication with the piston chamber 52. The second connector 562 is installed in the center through hole 561 on the cover 56. The second connector 562 is connected with an air pipe 563. The air pipe 563 is connected to an air pressure system 80 through an electromagnetic valve 70 (see FIG. 5). The first connectors 522 are respectively connected to the air pressure system 80 by respective air pipes 523. The first check valve 54 is connected to the axle bearing to be lubricated 90 through a delivery pipe 541. The grease storage tank 10 comprises an air inlet 14, a grease outlet 15 connected to the aforesaid output pipe 40, a piston 11 reciprocated on the inside, a magnetic ring 12 fixedly mounted on the piston 11, and a solenoid switch 13 disposed at one side near the grease outlet 15.

Figure 1:
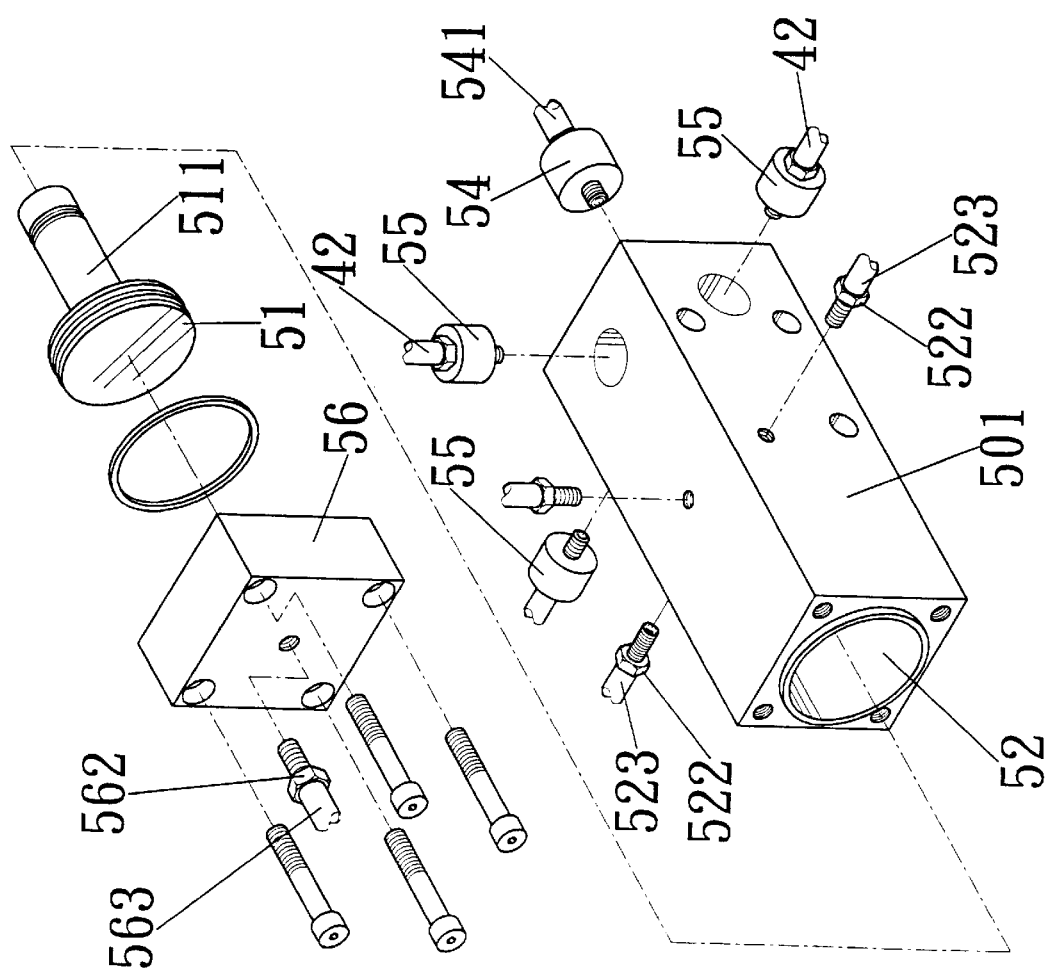
FIG. 1 is an exploded view of a grease propeller for an axle bearing lubricating according to the present invention.
Figure 2:
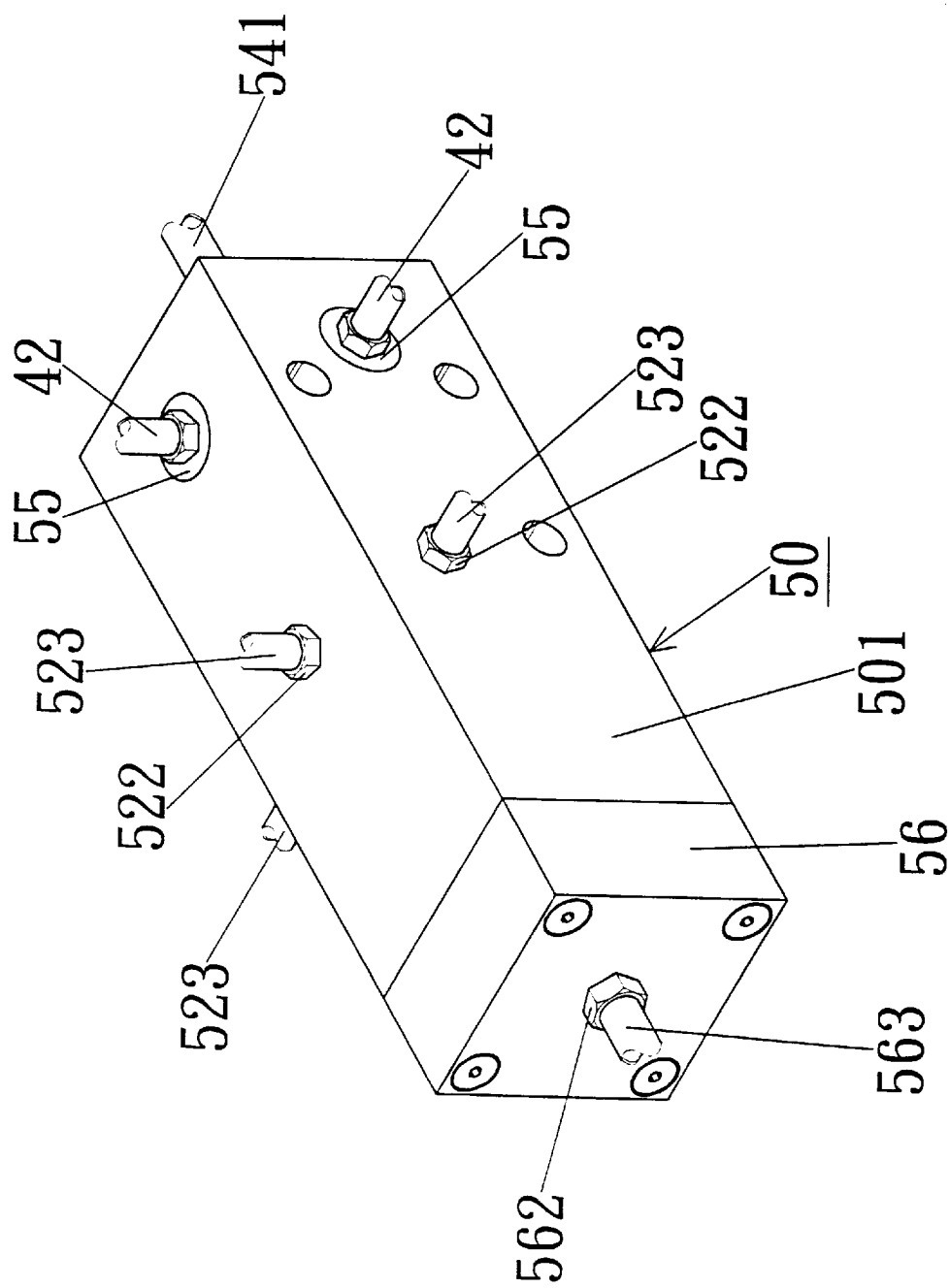
FIG. 2 is an elevational view of the grease propeller according to the present invention.
Figure 3:
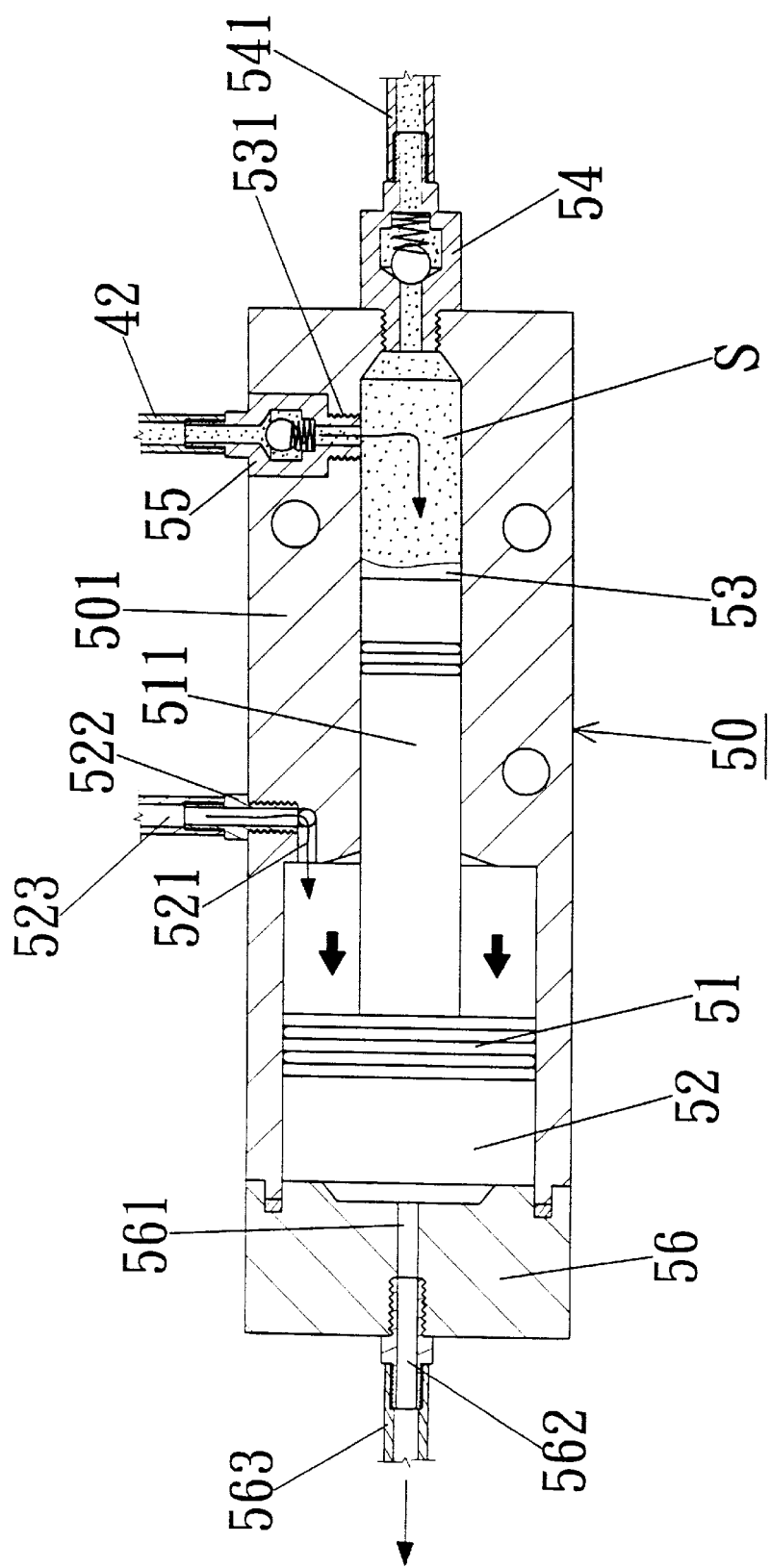
FIG. 3 is a sectional view of the grease propeller showing the piston moved to the front limit position.
Figure 4:
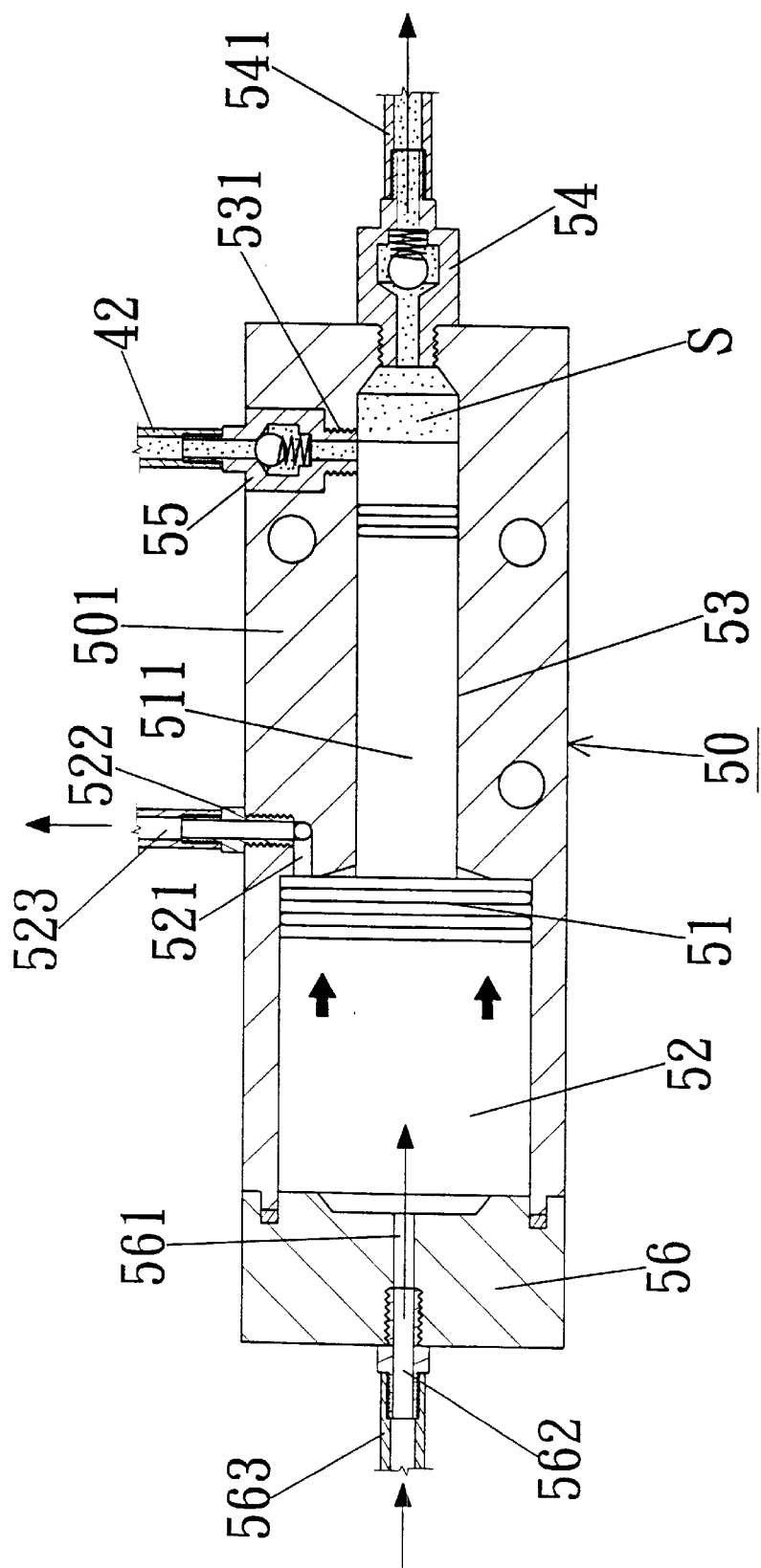
FIG. 4 is similar to FIG. 3 but showing the piston moved to the rear limit position

The operation of the present invention is outlined hereinafter with reference to FIGS. from 1 through 6 again. When the air pressure system 80 is started, high pressure air is forced through the air pipes 523 and the air holes 521 into the front piston chamber 52 to move the piston 51 forwards to the front limit position (see FIG. 3), at the same time air is expelled out of the front piston chamber 52 through the second connector 562 by the piston 51, and the piston rod 511 is moved with the piston 51 forwards, enabling grease S to be drawn from the grease outlet 15 of the grease storage tank 10 into the through hole 53 through the second check valves 55 and the grease delivery manifold 42 by means of the effect of a vacuum. The first check valve 54 enables grease S to be pushed out of the cylinder 501. The second check valves 55 enable grease to be delivered into the cylinder 501. After the piston 51 has been moved to the front limit position, high-pressure air is delivered from the air pressure system 80 through the electromagnetic valve 70 and the air pipe 563 into the second connector 562 to move the piston 51 backwards to the rear limit position (see FIG. 4), and at the same time grease S is expelled out of the first check valve 54 into the delivery pipe 541 by the piston rod 511, enabling grease S to be applied to the axle bearing 90. The piston 11 is moved in the grease storage tank 10, enabling grease S to be effectively delivered to the remote axle bearing 90. Further, the electromagnetic valve 70 is operated to open/close the air pipe 563, so as to further control the number of reciprocating cycles of the piston rod 511, enabling the desired amount of grease S to be applied to the axle bearing 90.

Figure 6:
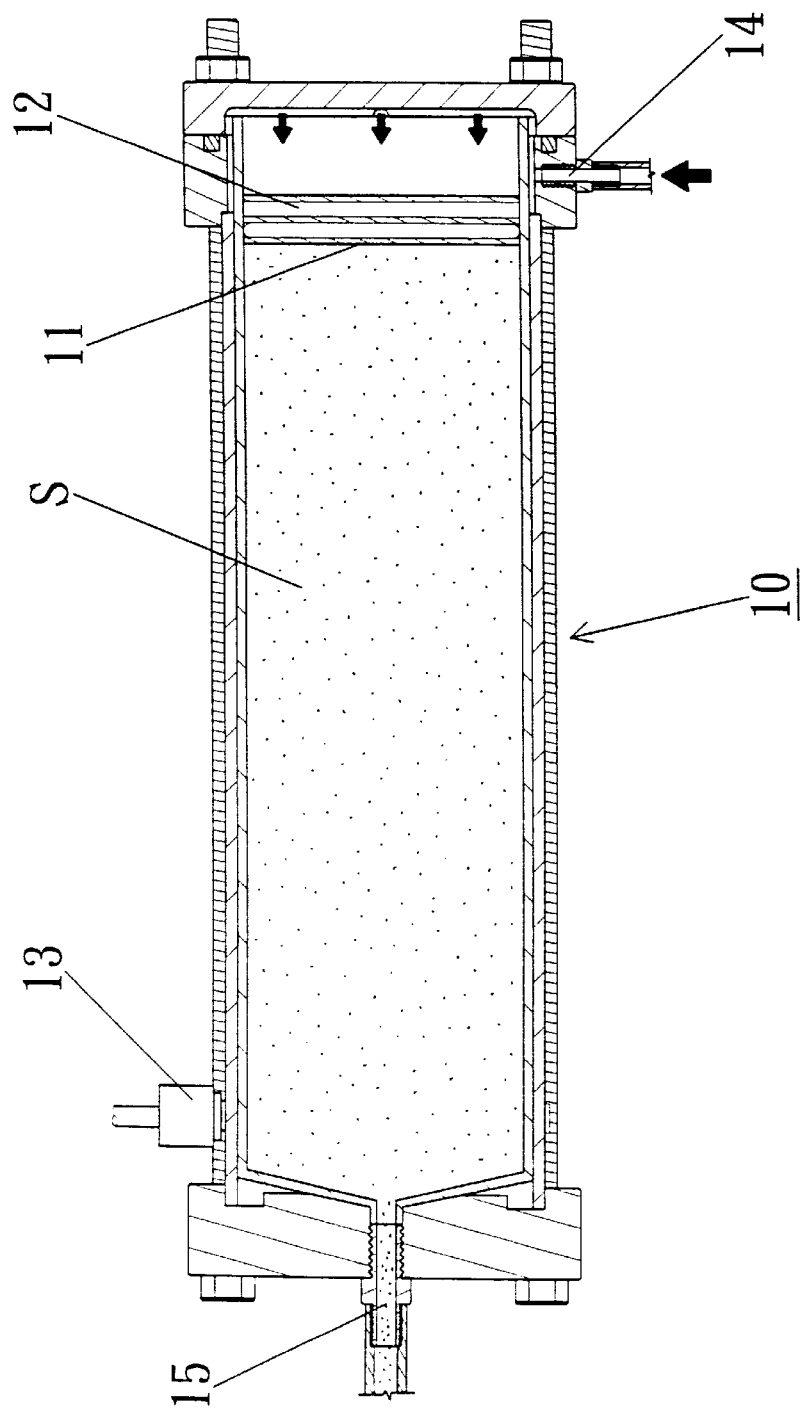
FIG. 6 is a sectional view of the grease storage tank for the axle bearing lubricating system according to the present invention.

Referring to FIGS. 6–7 the air inlet 14 is connected to the air pressure system 80 to receive high-pressure air, enabling the piston 11 to be forced forwards. When grease S is used up, the piston 11 is moved to the front limit position in the grease storage tank 10, and the solenoid switch 13 is induced by the magnetic ring 12 to turn off the air pressure system 80, enabling the grease storage tank 10 to be taken away for a replacement.

Referring to FIG. 7, multiple grease propellers 50 may be connected in parallel to the grease storage tank 10 and the air pressure system 80, and controlled to lubricate a respective axle bearing 90.

It is to be understood that the drawings are designed for purposes of illustration only, and are not intended for use as a definition of the limits and scope of the invention disclosed.

What the invention claimed is:

1. An axle bearing lubricating device comprising:
   a grease storage tank with a grease outlet, said grease storage tank provides lubricating grease to at least one grease propeller;
   said at least one grease propeller propels grease from said grease storage tank, said at least one grease propeller each including a cylinder, said cylinder including a front piston chamber, a longitudinal through hole axially extended from a center of said front piston chamber to a rear side thereof, a piston that reciprocates in said front piston chamber, a piston rod fixedly and perpendicularly extended from said piston and moved with said piston in said longitudinal through hole in said cylinder, a first check valve installed in a first end of said longitudinal through hole at a rear side of said cylinder remote from said piston chamber, said first check valve allows lubricating grease to be expelled from said cylinder, a plurality of second check valves installed in screw holes in said cylinder to allow lubricating grease to be delivered from said grease storage tank into said longitudinal through hole in said cylinder, a plurality of first connectors, each said first connector is installed in an air hole to allow high pressure air to be delivered into said piston chamber to move said piston forward, a cover on said front piston chamber, and a second connector installed in said cover for guiding air out of said piston chamber:
   a manifold connected between said grease outlet of said grease storage tank and said second check valves on each of said at least one grease propeller; and
   an air pressure system to output high-pressure air to said first connectors and said second connector of each of said at least one grease propeller to reciprocate said piston of each of said at least one grease propeller in said piston chamber; wherein
   said grease storage tank comprises an air inlet disposed at a rear side thereof and connected to said air pressure system, a grease outlet disposed at a front side thereof and connected to said manifold, a piston forced by high pressure air from said air pressure system to expel lubricating grease out of said grease storage tank, and a solenoid switch disposed near said grease outlet to turn off said air pressure system when said piston of said grease storage tank is moved to said grease outlet, and a magnetic ring fixedly mounted on said piston of said grease storage tank to operate said solenoid switch.

2. The axle bearing lubricating device as claimed in claim 1 wherein:
   said device further comprises at least one electromagnetic valve connected between said air pressure system and said second connector at each of said at least one grease propeller, said electromagnetic valve closes and opens said second connector at each of said at least one grease propeller.

3. The axle bearing lubricating device as claimed in claim 1 wherein;
   said first connectors of each of said at least one grease propeller are connected to said air pressure system by an air line.

4. The axle bearing lubricating device as claimed in claim 1 wherein;
   said first check valve of each of said at least one grease propeller is connected to a delivery pipe.

* * * * *